(12) United States Patent
Askarpour et al.

(10) Patent No.: US 12,499,772 B2
(45) Date of Patent: Dec. 16, 2025

(54) SYSTEMS AND METHODS FOR IMPLEMENTING AUTOMATED FLIGHT FOLLOWING OPTIONS AND UPGRADING LEGACY FLIGHT MANAGEMENT SYSTEMS

(71) Applicant: INNOVATIVE SOLUTIONS & SUPPORT, INC., Exton, PA (US)

(72) Inventors: Shahram Askarpour, Media, PA (US); Markus Knopf, Chester Springs, PA (US)

(73) Assignee: INNOVATIVE SOLUTIONS & SUPPORT, INC., Exton, PA (US)

( * ) Notice: Subject to any disclaimer, the term of this patent is extended or adjusted under 35 U.S.C. 154(b) by 171 days.

(21) Appl. No.: 18/141,263

(22) Filed: Apr. 28, 2023

(65) Prior Publication Data

US 2023/0360544 A1    Nov. 9, 2023

Related U.S. Application Data

(60) Provisional application No. 63/338,107, filed on May 4, 2022.

(51) Int. Cl.
*G08G 5/50*       (2025.01)
*G08G 5/21*       (2025.01)
(Continued)

(52) U.S. Cl.
CPC .............. *G08G 5/50* (2025.01); *G08G 5/21* (2025.01); *G08G 5/30* (2025.01); *G08G 5/55* (2025.01)

(58) Field of Classification Search
CPC .... G08G 5/0047; G08G 5/0021; G08G 5/003; G08G 5/0008; G08G 5/0013; G08G 5/0052; G08G 5/0078; G08G 5/00
(Continued)

(56) References Cited

U.S. PATENT DOCUMENTS 6,271,768 B1 *   8/2001   Frazier, Jr. ........... G08G 5/0078
6,278,396 B1 *   8/2001   Tran ..................... G08G 5/0078
(Continued)

FOREIGN PATENT DOCUMENTS

WO        2019203166 A1     10/2019

OTHER PUBLICATIONS

Written Opinion for PCT/US2023/020468 dated Sep. 6, 2023.
(Continued)

*Primary Examiner* — Truc M Do
*Assistant Examiner* — Ellis B. Ramirez
(74) *Attorney, Agent, or Firm* — Kevin Paganini, Esq.

(57) ABSTRACT

This disclosure relates to improved techniques for upgrading legacy flight management systems (FMSs) installed in an aircraft. In certain embodiments, an integrated guidance system (IGS) can be installed in an aircraft having a legacy FMS to provide enhance flight functionalities, such as required navigation performance (RNP), localizer performance with vertical guidance (LPV), and automatic dependent surveillance-broadcast (ADS-B), capabilities. Additionally, the IGS described can include, inter alia, a navigator system that receives and processes information from an ADS-B system to implement a variety of automated following options, each of which can provide an automated mechanism for controlling a flight path of the aircraft relative to another aircraft that is being tracked by an ADS-B system.

16 Claims, 8 Drawing Sheets

(51) Int. Cl.
    *G08G 5/30*         (2025.01)
    *G08G 5/55*         (2025.01)

(58) Field of Classification Search
    USPC .................. 701/3, 14, 17; 340/963; 342/33
    See application file for complete search history.

(56) References Cited

U.S. PATENT DOCUMENTS

| | | | |
|---|---|---|---|
| 6,308,116 B1* | 10/2001 | Ricks | G05D 1/0841 |
| 7,782,229 B1* | 8/2010 | Barber | G01C 23/005 |
| 8,121,747 B2* | 2/2012 | Loots | G01C 23/005 |
| 8,219,264 B1 | 7/2012 | Blake et al. | |
| 11,288,968 B2* | 3/2022 | Bortolini | G08G 5/0021 |
| 2005/0165516 A1 | 7/2005 | Haissig et al. | |
| 2009/0195436 A1 | 8/2009 | Ridenour et al. | |
| 2011/0163908 A1 | 7/2011 | Andersson et al. | |
| 2013/0261945 A1 | 10/2013 | Marcy et al. | |
| 2014/0324255 A1 | 10/2014 | Siddiqi et al. | |
| 2015/0321758 A1 | 11/2015 | Sarna, II et al. | |
| 2016/0275801 A1 | 9/2016 | Kopardekar et al. | |
| 2016/0328981 A1 | 11/2016 | Herder et al. | |
| 2017/0032683 A1 | 2/2017 | Meserole, Jr. et al. | |
| 2017/0068253 A1* | 3/2017 | Hedrick | G01S 1/047 |
| 2017/0297736 A1 | 10/2017 | Frolov et al. | |
| 2017/0364068 A1 | 12/2017 | Harada et al. | |
| 2018/0190132 A1 | 7/2018 | Cronkhite et al. | |
| 2018/0324546 A1 | 11/2018 | Jones et al. | |
| 2018/0335779 A1 | 11/2018 | Fisher et al. | |
| 2019/0160315 A1 | 5/2019 | Head et al. | |
| 2019/0227540 A1 | 7/2019 | Suvitie et al. | |
| 2020/0175881 A1 | 6/2020 | Trim et al. | |
| 2021/0141394 A1* | 5/2021 | Melendez | G05D 1/46 |
| 2021/0149420 A1 | 5/2021 | Lebbos et al. | |
| 2022/0258872 A1* | 8/2022 | Hedrick | C09D 163/00 |

OTHER PUBLICATIONS

Hull et al., (Oct. 2004) "Technology-enabled airborne spacing and merging", in The 23rd Digital Avionics Systems Confrence, pp. 1-9.

Dogan et al., (Jul. 2005), "Modeling of Aerodynamic Coupling Between Aircraft in Close Proximity", vol. 42 of JA Aircraft, No. 4, pp. 1-15.

Non-Final Office Action issued in corresponding U.S. Appl. No. 18/141,122 dated Feb. 28, 2025, pp. 1-28.

\* cited by examiner

SYSTEMS AND METHODS FOR IMPLEMENTING AUTOMATED FLIGHT FOLLOWING OPTIONS AND UPGRADING LEGACY FLIGHT MANAGEMENT SYSTEMS

CROSS-REFERENCE TO RELATED APPLICATIONS

This application claims benefit of, and priority to, U.S. Provisional Patent Application No. 63/338,107 filed on May 4, 2022. The content of the above-identified application is herein incorporated by reference in its entirety.

TECHNICAL FIELD

This disclosure describes, inter alia, enhanced guidance systems that leverage automatic dependent surveillance-broadcast (ADS-B) technologies to supplement the navigation functionalities and control of aircraft. This disclosure also describes an integrated guidance system that can be installed in aircraft to augment or supplement functionalities of legacy flight management systems.

BACKGROUND

Many types of aircraft are equipped with legacy flight management systems (FMSs), which can perform various types of navigation and flight planning functions for aircraft. These legacy flight management systems do not have required navigation performance (RNP) or localizer performance with vertical guidance (LPV) capabilities. In various scenarios, aircraft providers may wish to upgrade an aircraft to include these enhanced capabilities and functionalities (e.g., due to updated regulatory compliance measures). However, upgrading an aircraft with these capabilities and functionalities traditionally requires replacement of the legacy FMS installed in the aircraft and implementing these upgrades can be costly in terms of both time and expense.

Certain types of modern aircraft are equipped with automatic dependent surveillance-broadcast (ADS-B) systems. These ADS-B systems typically utilize global positioning system (GPS) technology to broadcast locations of aircraft to each other and to traffic controller facilities. The data collected by such ADS-B systems is utilized by aircraft in a very limited fashion. For example, the data collected by the systems is typically used notify a pilot of nearby aircraft traffic. However, these ADS-B systems are not utilized to enhance the navigation capabilities of the aircraft in any manner.

BRIEF DESCRIPTION OF DRAWINGS

To facilitate further description of the embodiments, the following drawings are provided, in which like references are intended to refer to like or corresponding parts, and in which.

Figure 1:
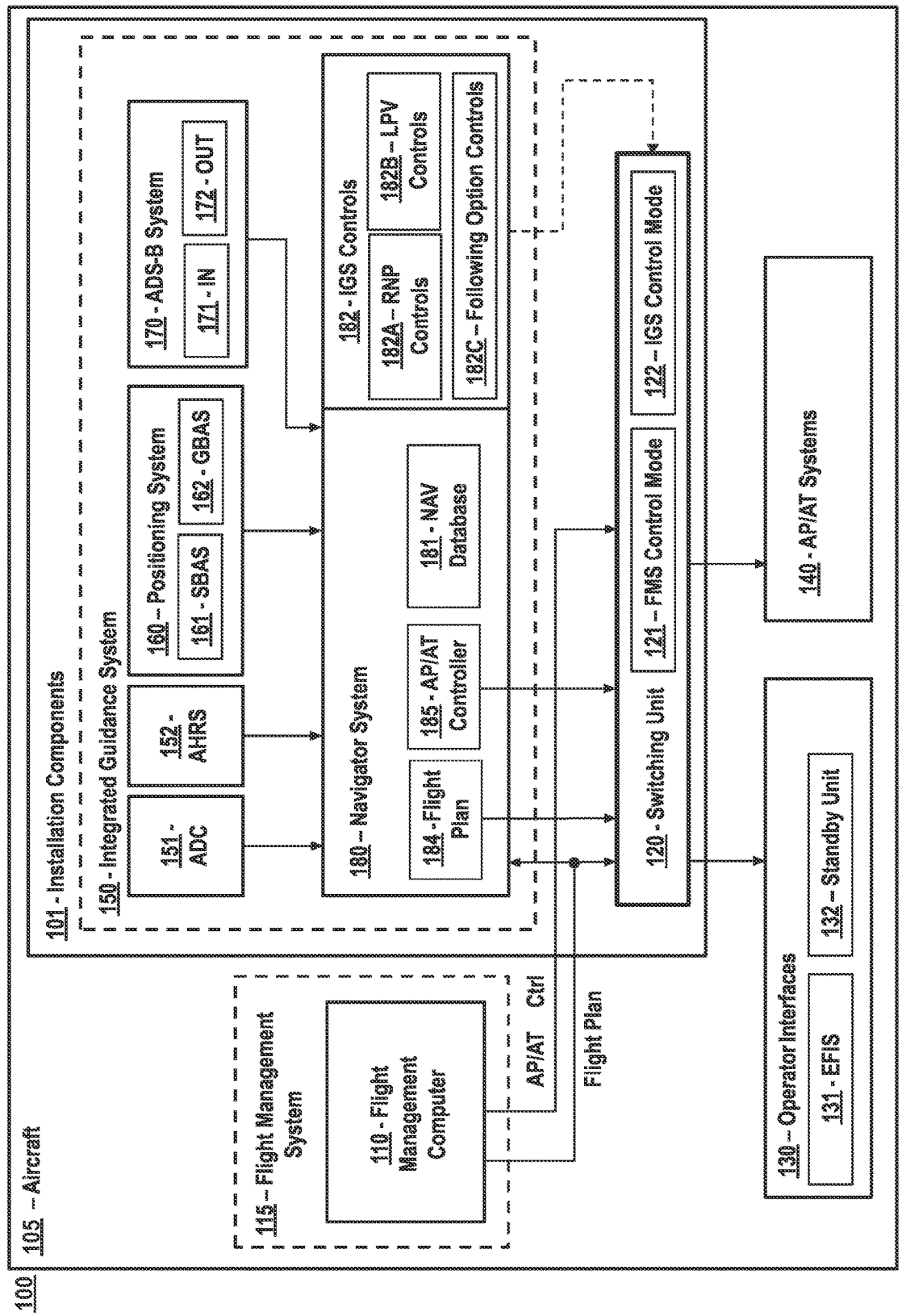
FIG. 1 is a diagram of an exemplary vehicle navigation system in accordance with certain embodiments.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "connect," "connected," "connects," "connecting," "couple," "coupled," "couples," "coupling," and the like should be broadly understood and refer to linking two or more elements or signals, electrically, electronically, mechanically and/or otherwise. Connecting/coupling may be for any length of time, e.g., permanent or semi-permanent or only for an instant. "Electrical connecting," "electrical coupling," and the like should be broadly understood and include connecting/coupling involving any electrical signal, whether a power signal, a data signal, and/or other types or combinations of electrical signals. "Mechanical connecting," "mechanical coupling," and the like should be broadly understood and include mechanical connecting/coupling of all types.

The term "primary" in the description and in the claims, if any, is used for descriptive purposes and not necessarily for describing relative importance. For example, the term "primary" can be used to distinguish between a first component and an equivalent redundant component; however, the term "primary" is not necessarily intended to imply any distinction in importance between the so-called primary component and the redundant component. Unless expressly stated otherwise, any redundant component(s) should be treated as being able to operate interchangeably with any primary component(s) of the system, in tandem with any primary component(s), and/or in reserve for any primary component(s) (e.g., in the event of a component/system failure).

The terms "pilot," "pilots," "operator," "operators," or the like should be broadly understood to refer to any individual or user, and not necessarily to individuals who are certified to operate or fly aircraft.

DETAILED DESCRIPTION OF EXEMPLARY EMBODIMENTS

The present disclosure relates to systems, methods, apparatuses, and techniques for upgrading or augmenting the functionalities and capabilities of legacy flight management systems (FMSs). In certain embodiments, an integrated guidance system (IGS) can be installed in an aircraft equipped with a legacy FMS to provide enhanced flight functionalities, such as required navigation performance (RNP), localizer performance with vertical guidance (LPV), automatic dependent surveillance-broadcast (ADS-B), and/or other capabilities described herein. The solutions described herein can incorporate these functionalities and capabilities into an aircraft without having to modify or replace the legacy FMS, which can be expensive in terms of both time and costs.

Additionally, the IGS described herein can include, inter alia, a navigator system that receives and processes information from an ADS-B system to implement a variety of automated following options, each of which can provide an automated mechanism of controlling the flight path of an aircraft relative to another aircraft that is being tracked by the ADS-B system. As explained in further detail below, exemplary automated following options may permit a pilot to follow a target aircraft at a specified distance, fly side-by-side next to a target aircraft, fly above or below a target aircraft, and/or fly in a specified flight formation with one or more target aircraft. The ADS-B information can be leveraged to implement many other automated following options as well. Regardless of which automated following option is selected, the navigator system can utilize the ADS-B information to compute a corresponding flight plan, and can transmit commands to an autopilot and/or auto-throttle system to execute the selected automated following option.

An operator interface included in the cockpit of an aircraft can permit a pilot to view various information related to the RNP, LPV, ADS-B and/or other upgraded functionalities that are provided by the IGS, and to control these functionalities. The operator interface also can permit a pilot to select one or more automated following options and customize various parameters relating to the following options (e.g., such as following distance behind a designated aircraft, following time behind a designated aircraft, a three-dimensional offset relative to a designated aircraft, etc.). In some embodiments, the operator interface can be an electronic flight instrument system (EFIS) interface, a standby unit interface, and/or other display component that is already included in the cockpit of the aircraft. Incorporating the improved capabilities and technologies described herein into an existing display component can be beneficial given that there is limited available space in most cockpits. However, in some embodiments, the improved capabilities and technologies can be incorporated into a separate display device that is provided with installation of the IGS.

During operation of an aircraft, a switching unit permits a pilot or operator to switch between a FMS control mode, which utilizes the FMS for navigation control, and an IGS control mode, which utilizes the IGS (or navigator system) for navigation control. For example, in some cases, the FMS control mode may be utilized to control operation of the aircraft during various phases of flight, and the pilot or operator can switch to the IGS control mode when enhanced functionality is desired (e.g., during an RNP approach and/or LPV approach, or when an automated following option is desired). The operator interface (or other component) provided in the cockpit can include options that permit the pilot or operator to switch back and forth between the FMS control mode and IGS control mode.

The technologies discussed herein can be used in a variety of different contexts and environments. One useful application of these technologies is in the context of commercial aircraft. In many cases, commercial aircraft may require upgrading due to regulatory or industry compliance standards. The technologies described herein can provide a cost-effective solution of upgrading the aircraft and providing those aircraft with additional functionalities and capabilities. Another useful application of these technologies is in the context of military aircraft. Groups of military aircraft routinely fly in predetermined flight formations, and the automated following options described herein can enable military aircraft to select a desired formation and automatically control the aircraft to fly in accordance with the desired formation. The technologies discussed herein can also be applied to many other useful applications as well.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

FIG. 1 is a diagram of an exemplary vehicle navigation system 100 in accordance with certain embodiments. In many embodiments, the vehicle navigation system 100 may be installed in an airplane or other type of aircraft 105. The vehicle navigation system 100 comprises one or more flight management computers (FMCs) 110, one or more switching units 120, one or more operator interfaces 130, one or more autopilot and autothrottle (AP/AT) systems 140, and one or more integrated guidance systems (IGSs) 150. Each of the one or more IGSs 150 can include one or more air data computers (ADCs) 151, one or more attitude and heading reference systems (AHRSs) 152, one or more positioning systems 160, one or more automatic dependent surveillance-broadcast (ADS-B) systems 170, and one or more navigator systems 180.

Further, each ADS-B system 170 can include at least one ADS-B input 171 and at least one ADS-B output 172. Each of the positioning systems 160 can include at least one satellite-based augmentation system (SBAS) 161 and/or at least one ground based-augmentation system (GBAS) 162. Each of the navigator systems 180 can include at least one navigation (NAV) database 181 and at least one set of integrated guidance system controls 182. Each of the operator interfaces 130 can include at least one electronic flight instrument system (EFIS) 131, at least one standby unit 132, at least one FMS CDU, at least one MCDU and/or other types of display devices or panels.

The configuration of the vehicle navigation system 100 can vary. Generally speaking, the components of the vehicle navigation system 100 can be connected or coupled to each other in any manner. For example, each component can be coupled or connected to any or every other component illustrated in FIG. 1.

In the exemplary configuration illustrated in FIG. 1, the ADC 151, AHRS 152, positioning system 160, and ADS-B system 170 are connected or coupled to the navigator system 180, and provide corresponding data to the navigator system 180. The navigator system 180 can be connected or coupled to the switching unit 120, which, in turn, can be connected or coupled to the operator interface 130 and AP/AT systems 140. The FMC 110 can be connected or coupled to the switching unit 120 and the navigator system 180.

In certain embodiments, the installation components 101 illustrated in FIG. 1 represent components that can be integrated into older aircraft 105 to retrofit the aircraft 105 with modern equipment, and add various functionalities, capabilities, and features to the aircraft (e.g., including the RNP, LPV, and ADS-B functionalities described herein). Traditional methods of upgrading an aircraft 105 to include these functionalities are costly, and typically require replacement or modification of the aircraft's flight management system (FMS) and/or multi-mode receiver (MMR) systems. Amongst other benefits, the upgraded solution illustrated in FIG. 1 provides a cost-effective manner of adding required navigation performance (RNP), localizer performance with vertical guidance (LPV), ADS-B, and other functionalities to older aircraft in manner that does not require replacement or modification of the aircraft's FMS or MMR systems.

As explained in further detail below, another advantage of this configuration is that it permits the navigator system 180 to leverage data from the ADS-B system 170 to control an aircraft 105 to implement various automated following options (e.g., such as by controlling its flight path and AP/AT systems 140). A further benefit of this configuration is that it can be integrated with various operator interfaces 130 (e.g., an EFIS 131, FMS CDU, MCDU and/or standby unit 132) that are already included in the cockpit of the aircraft 105, thereby avoiding the need to incorporate additional display panels in cockpits that have very limited and overly-congested space. Further details of these and other features are described throughout this disclosure.

While FIG. 1 illustrates a vehicle navigation system 100 for an aircraft 105 that includes one of each of the afore-mentioned components (e.g., including the installation components 101, FMC 110, switching unit 120, operator interface 130, and AP/AT systems 140), it should be recognized that the vehicle navigation system 100 can include any number of each component. For example, in some cases, the vehicle navigation system 100 may include only one of each component. In other embodiments, the vehicle navigation system 100 may include two or more of each component (e.g., to provide redundancy). A brief description of each of these components is provided below.

The FMC 110 can be a component that is included in an aircraft's FMS 115, which may include various subsystems such as one or more navigation radio receivers, one or more inertial reference systems, one or more air data systems, one or more flight control systems, one or more engine and fuel systems, one or more data links, and one or more displays (e.g., for displaying navigation, flight and instrument information). The FMC 110 can be connected or coupled to these subsystems, and can manage each of these subsystems. The FMC 110 can be configured to perform functions such as navigation, flight planning, route optimization, en route guidance, trajectory prediction, and performance calculation. In some embodiments, the FMS 115 may represent a legacy FMS with limited capabilities (e.g., a legacy MD-80/90 FMS system), such as one that does not provide RNP, LPV, and/or ADS-B capabilities.

The AP/AT system 140 can generally perform any functions associated with executing autopilot functions and auto-throttle functions. Autopilot functions can include functions that enable a flight path of an aircraft 105 to be controlled without (or with minimal) manual assistance of a human operator. Auto-throttle functions can enable the power or thrust of an aircraft's engines to be controlled without (or with minimal) manual assistance of a human operator. The AP/AT system 140 can include separate subsystems for controlling these functions (e.g., a first subsystem for controlling autopilot functions and a second subsystem for controlling auto-throttle functions), or can include a single, integrated system that controls both autopilot and auto-throttle functions.

The ADC 151 can be configured to generate various flight metrics, such as airspeed, Mach number, altitude, rate of descent, rate of climb, etc. This information may be generated based on inputs received from various sensors installed in an aircraft 105. The information generated by the ADC 151 can be provided to the navigator system 180.

The AHRS 152 can be configured to measure angular rate, acceleration, and Earth's magnetic field, and to calculate of the aircraft's attitude. The AHRS 152 may include sensors on three axes to compute attitude information for the aircraft 105, including data indicating roll, pitch, and yaw. The information generated by the AHRS 152 can be provided to the navigator system 180.

The operator interfaces 130 can generally include any type of display device that can be included in a cockpit of an aircraft 105. In some embodiments, the operator interfaces 130 can include one or more light-emitting diode (LED) displays, one or more liquid crystal displays (LCDs), one or more cathode ray tube (CRT) displays, and/or other types of displays. The operator interfaces 130 also can include selectable options (e.g., buttons, dials, capacitive touch-screens, switches, etc.) that enable pilots or operators to make selections.

One type of exemplary operator interface 130 is an EFIS 131. The EFIS 131 can include an electronic display that provides information on various flight instruments. The EFIS 131 may include a primary flight display (PFD), a multi-function display (MFD), and an engine indicating and crew alerting system (EICAS).

Another type of exemplary operator interface 130 is a standby unit 132. The standby unit 132 can include (or be connected to) sensors that calculate and process various flight parameters, such as altitude, attitude, airspeed, slip/skid, and navigation display information. The standby unit 132 also may include an electronic display that outputs this information to pilots.

Another exemplary operator interface 130 can include a multi-function control and display unit (MCDU). The MCDU can provide a computer interface that allows pilots to input data and receive feedback about various aspects of the aircraft's operations, including fuel consumption, flight path, and altitude, and can be utilized to perform functions associated with flight planning, navigation, and performance computations. In some cases, the MCDU can utilize data obtained from the FMS 115 (or FMC 110) and/or the navigator system 180 to perform these and other functions.

Another exemplary operator interface 130 can include a FMS control display unit (CDU). The FMS CDU to communicate with the FMS 115 (or FMC 110) and displays information from the FMS, such as the aircraft's position, groundspeed, wind data, estimated time of arrival, and other related information. The FMS CDU also can be used to enter flight plan data, such as departure and destination airports, waypoints, and altitude restrictions, as well as other performance data, such as takeoff and landing speeds and fuel consumption.

Other types of operator interface 130 also be included in the vehicle navigation system 100. Regardless of whether the operator interface 130 is a display that is already installed in the cockpit (e.g., an EFIS 131, standby unit 132, FMS CDU, or MCDU) or an additional display that is added to the cockpit, the operator interface 130 can be configured with enhanced functionality as described herein (e.g., including the functionalities related to implementing automated following options, switching between alternative navigation systems, executing RNP/LPV approaches, and displaying ADS-B information).

In certain embodiments, when the IGS system 150 is integrated with a standby unit 132, the standby unit 132 can be configured to sense and calculate airspeed, altitude, vertical speed, pitch, roll, heading, and/or other flight parameters. These flight parameters can be provided to the navigator system 180 and utilized by the navigator system 180 to perform various navigation functions, including the functions mentioned in this disclosure. Alternatively, or additionally, the IGS system 150 can be integrated with other types of operator interfaces 130 (e.g., an EFIS 131, FMS CDU, MCDU or a separate display) and the FMS 115 can be configured to sense and calculate airspeed, altitude, vertical speed, pitch, roll, heading, and/or other flight parameters. In this scenario, the FMS 115 can communicate these flight parameters to the navigator system 180 when the aircraft 105 is operating in an IGS control mode 122.

The positioning system 160 can include a SBAS 161 and/or a GBAS 162. Both SBAS 161 and GBAS 162 can operate to augment GPS data and/or enhance the accuracy of the aircraft's GPS. In certain embodiments, the SBAS 161 may can include a Beta 3 WAAS GPS, and can communicate with stationary land-based GNSS (global navigation satellite system) monitors to calculate GNSS position errors caused by atmospheric and ionospheric disturbances, satellite orbit errors, and inaccurate clocks, and utilize this information to enhance GPS positioning. Similarly, GBAS 162 can augment GPS positioning information by communicating with GBAS-based ground facilities situated in the vicinity of airports to improve the accuracy and integrity of the aircraft's GPS navigational position. The information generated by the SBAS 161, GBAS 162, and/or other positioning system 160 can be provided to the navigator system 180.

The ADS-B system 170 can permit an aircraft to determine and broadcast its position (e.g., GPS coordinates), and to view and track positions of other aircraft in the sky (e.g., on an operator interface 130). While radar relies on radio signals and antennas to determine locations of aircraft, the ADS-B system 170 can utilize satellite signals to track aircraft locations. The ADS-B output 172 can periodically broadcast information (e.g., GPS location, altitude, speed, etc.) about an aircraft, and the broadcasted information can be received by other aircraft and ground controllers. The ADS-B input 171 can receive information broadcasted from other aircraft to permit pilots to understand the positions of other aircraft in the vicinity. The ADS-B input 171 also can receive other useful information, such as weather information, advisories, and Notices to Airmen. The data received and/or generated by the ADS-B system 170 can be provided to the navigator system 180, and can be displayed on an operator interface 130.

The navigator system 180 can serve as an alternative navigation system to the one that is provided by the FMS 115. As mentioned, traditional FMSs 115 included in older aircraft have limited capabilities and typically do not have RNP, LPV, and ADS-B capabilities. The navigator system 180 can include or more navigator computing devices that utilize data received from the other installation components 101 (e.g., ADC 151, AHRS 152, positioning system 160, and ADS-B system 170) to augment or supplement the functionality of the FMS 115, and configure an aircraft with RNP, LPV, and ADS-B capabilities. For example, the navigator system 180 may include IGS controls 182 that include: RNP controls 182A for controlling execution of RNP approaches and other RNP functionalities; LPV controls 182B for controlling execution of LPV approaches and other LPV functionalities; and following option controls 182C for controlling execution of following options and related functionalities.

The navigator system 180 (or associated IGS controls 182) can transmit control signals or commands to the AP/AT system 140 to implement RNP, LPV, and/or other functions. RNP generally refers to a collection of navigation specifications that permit the operation of aircraft along a precise flight path with a high level of accuracy, and the ability to determine aircraft position with both accuracy and integrity. LPV generally refers to aviation instrument approach procedures that utilize satellite guidance to execute approaches with high precision. While many legacy FMSs 115 do not allow for RNP and LPV capabilities, the navigator system 180 can provide these enhanced functions to aircraft. In many cases, the IGS controls 182 (e.g., RNP controls 182A and LPV controls 182B) of the navigator system 180 can compute a flight plan 184 to implement desired RNP/LPV approaches or maneuvers, and control the AP/AT system 140 (using AP/AT controller 185) to execute the desired RNP/LPV approaches or maneuvers.

Additionally, the navigator system 180 can communicate with the ADS-B system 170 to receive TIS-B (traffic information service-broadcast) information. As described in further detail below, the navigator system 180 (e.g., the IGS controls 182 or following option controls 182C) can utilize this TIS-B information to compute flight plans 184 and transmit commands to the AP/AT system 140 for implementing various types of automated following functions. In some cases, the AP/AT controller 185 of the navigator system 180 is configured to control operation of the AP/AT system 140 and cause the AP/AT system 140 to execute the flight plans 184 computed for the automated following options. Examples of these automated following functions are described in further detail below.

The navigator system 180 can include a navigation (NAV) database 181. The NAV database 181 can store various flight parameters and measurements pertaining to an aircraft, such as attitude, altitude, airspeed, vertical speed, slip, heading, cross track, vertical deviation performance, horizontal deviation performance, three-axis acceleration, location (e.g., GPS coordinates), trajectory information, flight plans, TIS-B traffic information, etc. The information stored in the NAV database 181 may be generated by, and received from, the installation components 101 (e.g., ADC 151, AHRS 152, positioning system 160, ADS-B system 170, and navigator system 180) and, in some cases, the FMS 115 and FMC 110. The navigator system 180 (e.g., IGS controls 182) may access and utilize this information to implement various functionalities described herein (e.g., RNP approaches, LPV approaches, automated following options, etc.).

The switching unit 120 allows control of the aircraft to be switched between the FMC 110 (or associated FMS 115) and the IGS 150. A pilot may select a control option (e.g., on a standby unit 132 or other operator interface 130) to transition navigation control of the aircraft from a FMS control mode 121 that is controlled by the FMC 110 to an IGS control mode 122 that is controlled by the navigator system 180, and to transition navigation control from the IGS control mode 122 back to the FMS control mode 121. For example, in some scenarios, a pilot can utilize a legacy FMC 110 and/or FMS 115 to control an aircraft during certain phases of flight, and then can switch control to the IGS system 150 during certain flight phases or when enhanced functionality is desired (e.g., when RNP or LPV is desired, or to perform the automated flight following options described herein).

In certain embodiments, when navigation control is transitioned from the FMS control mode 121 to the IGS control mode 122, a user can be presented with various options on an operator interface 130, e.g., such as options that enable a pilot to initiate or perform a RNP approach and/or a LPV approach. Options also may be presented that enable the pilot to initiate or perform various automated following options, and to customize parameters associated with the automated following options.

In certain embodiments, when an RNP approach option is selected in the operator interface 130, the navigator system 180 will initiate a Direct-To Initial Approach Fix (IAF) as a starting point for the guidance from the current aircraft position. The navigator system 180 also can take control over the AP/AT system 140 and provide commands to the AP/AT system 140 (e.g., using AP/AT controller 185) for controlling the speed, lateral guidance, vertical guidance, and/or thrust of the aircraft. RNP scales and related data also can be presented to the pilot on the operator interface 130.

As mentioned above, the navigator system 180 can utilize the data received from the ADS-B system 170 to facilitate automated following options. Initially, the ADS-B system 170 can receive information (e.g., TIS-B information) that indicates the locations of other aircraft located in the vicinity, and this information can be displayed on an operator interface 130 to the pilot. The operator interface 130 also can permit a pilot to select any aircraft that is displayed on the operator interface 130. Selecting an aircraft via the operator interface 130 can permit the pilot to view various parameters relating to the selected aircraft including: the speed of the selected aircraft; the location or GPS coordinates of the selected aircraft, the altitude of the selected aircraft; the previous flight path of the selected aircraft; and the predicted future flight path of the selected aircraft. Other parameters also may be displayed.

In addition to displaying various parameters relating to a selected aircraft, the operator interface 130 also may present various automated following options. The automated following options can provide an automated means of controlling the flight path of the aircraft relative to one or more target aircraft selected on the operator interface 130. For example, the following options may permit a pilot or operator to follow a target aircraft from a specified altitude, lateral track, distance and/or time. In response to selecting a desired following option, the navigator system 180 (e.g., IGS controls 182 or following option controls 182C) automatically computes a new flight path for the aircraft and controls the AP/AT system 140 to execute the desired following option. Examples of automated following options are described below.

Figure 2:
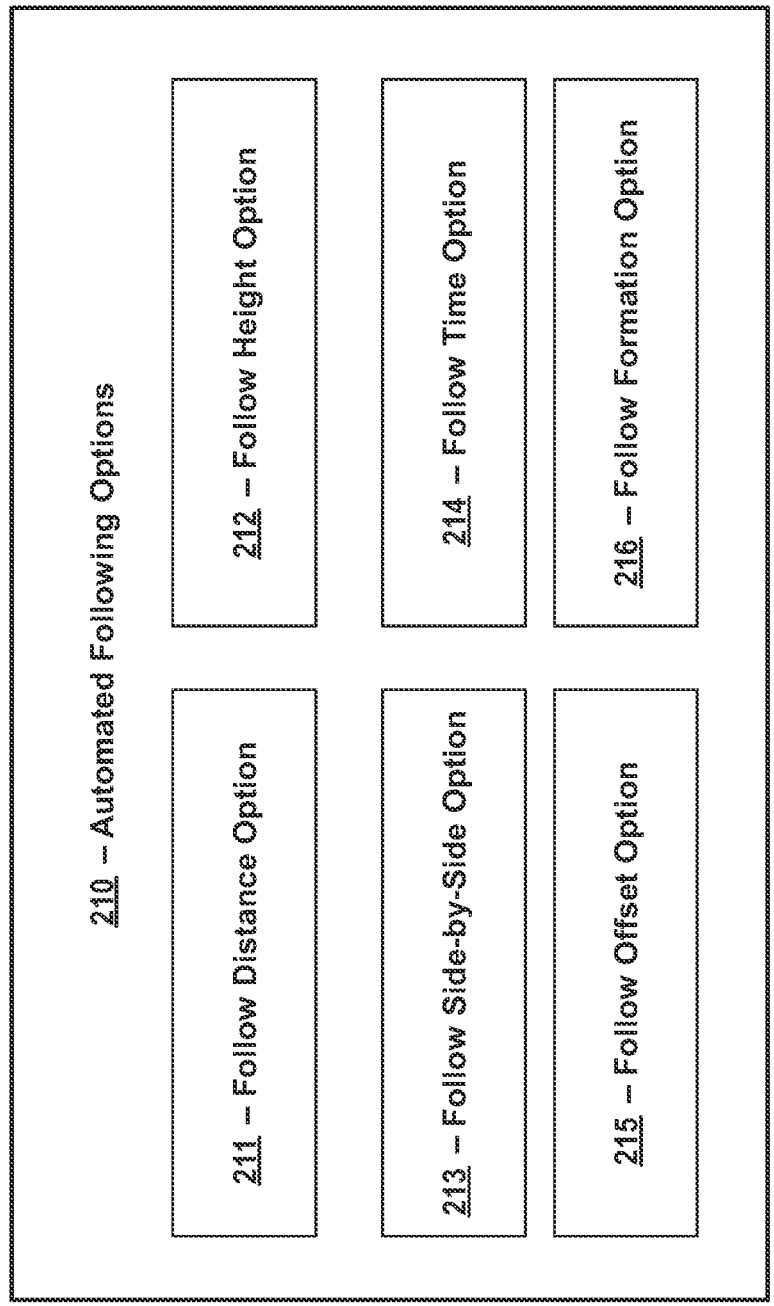
FIG. 2 is block diagram illustrating exemplary automated following options in accordance with certain embodiments.

FIG. 2 is a block diagram illustrating exemplary automated following options 210 according to certain embodiments. The exemplary automated following options 210 can include a follow distance option 211, follow height option 212, follow side-by-side option 213, follow time option 214, follow offset option 215, and follow formation option 216. In certain embodiments, an operator can interact with the operator interface 130 to view and select or activate these and/or other automated following options 210.

a) Follow distance option 211: This option causes the aircraft to follow in the rear of a selected aircraft at a specified distance, and may permit allow the pilot or operator to specify the desired distance behind the selected aircraft.

b) Follow height option 212: This option permits a pilot to follow a selected aircraft at a specified height or distance above or below the selected aircraft, and may permit the pilot or operator to specify the desired height above or below the selected aircraft.

c) Follow side-by-side option 213: This option causes the aircraft to follow next to (side-by-side) a selected aircraft, and may permit the pilot or operator to specify a desired distance between the two aircraft.

d) Follow time option 214: This option causes the aircraft to follow behind a selected aircraft at a specified time offset (e.g., five or ten minutes behind the selected aircraft), and may permit the pilot or operator to specify the desired time offset.

e) Follow offset option 215: This option causes the aircraft to follow a selected aircraft based on a three-dimension (3D) following offset for each of the x, y, and z axes relative to the selected aircraft. For example, a pilot or operator can specify a 3D offset that determines a horizontal (or lateral) and vertical distance from the selected aircraft, as well as a distance behind or in front of the aircraft.

f) Follow formation option 216: This option enables the aircraft to fly in a designated formation with at least one additional aircraft. In some cases, the follow formation option 216 can be customized to allow an aircraft to fly in a particular position of a flight formation that includes two or more aircraft (e.g., in a military formation).

Additional following options 210 also can be presented to enable automated following of desired aircraft. For example, in some cases, automated following options 210 can be customized to allow for easy following of selected aircraft in a manner that is consistent with In-Trail Procedure (ITP) guidelines. In other examples, automated following options 210 can be customized to allow an aircraft to fly in various lateral paths or tracks next to a selected aircraft. Other types of automated following options 210 also can be presented on the operator interface 130. Additionally, the automated following options 210 described herein can be combined in any appropriate manner.

In response to selecting one or more of the automated following options 210, the navigator system 180 (e.g., following option controls 182C) can automatically calculate a flight plan 184 for executing the desired following option. The flight plan 184 can be generated based, at least in part, on monitoring the parameters (e.g., speed, altitude, projected flight path, etc.) of the selected aircraft using the ADS-B system 170, and the navigator system 180 can control the AP/AT system 140 to execute the flight plan 184. Additionally, the selected aircraft can be continuously monitored to detect changes in the parameters of the selected aircraft (e.g., based on the information that is continuously received via the ADS-B input 171). If necessary, the navigator system 180 can continuously update the flight plan 184 and provide appropriate commands to the AP/AT system 140 to account for any changes or deviations of the selected aircraft.

In one example, a follow distance option 211 can be activated by an operator (e.g., a pilot), which enables the aircraft 105 to follow or trail a target aircraft identified by the ADS-B system 170. When activating the follow distance option 211, an operator may select the target aircraft on the operator interface 130 and a desired distance between the two aircraft may be specified (e.g., either specified by the operator or automatically selected by the navigator system 180). The navigator system 180 can then compute a flight plan 184 that enables the aircraft to follow the target aircraft at the selected following distance. In some examples, an initial segment of the flight plan 184 may include an intercept path that places the aircraft 105 behind the target aircraft (e.g., at the same or similar altitude as the target aircraft). A second segment of the flight plan 184 can include a flight path that matches (or substantially matches) the flight plan of the target aircraft. In the second segment, the heading and/or direction of the aircraft 105 can be aligned to match the target aircraft after the aircraft 105 is situated behind the target aircraft. The navigator system 180 can then control the AP/ST system 140 (e.g., using AP/AT controller 185) to execute the flight plan 184. Additionally, the ADS-B system 170 can continuously track the location and movements of the target aircraft, and the navigator system 180 can adjust the flight plan 184 based on any detected changes in the flight path of the target aircraft to enable the aircraft 105 to continuously tail or follow the target aircraft at the specified distance.

In a similar manner, the follow time option 214 can be activated to cause the aircraft 105 to follow behind the target aircraft at a specified time interval (e.g., five or twenty minutes behind the target aircraft). Again, the time interval may be specified by the operator and/or may be automatically selected by the navigator system 180. An initial segment of flight plan 184 computed by the navigator system 180 can identify an intercept path that places the aircraft 105 behind the target aircraft at a distance that is consistent with the specified time interval, and a second segment of the flight plan 184 can include a flight path that matches the flight path of the target aircraft. In the same manner described above, the navigator system 180 can then control the AP/ST system 140 to navigate the aircraft along the flight plan 184. The ADS-B system 170 can continuously track the location and movements of the target aircraft, and the navigator system 180 can adjust the flight plan 184 and/or AP/AT controller 185 to continuously tail or follow the target aircraft at the specified time interval.

In some cases, the operator may additionally, or alternatively, activate a follow height option 212 that permits the aircraft 105 to follow a target aircraft identified by the ADS-B system 170 at a specified distance above or below the target aircraft identified by the ADS-B system 170. Again, the operator may select the target aircraft using the operator interface 130, and the distance above or below the target aircraft may specified by the operator and/or selected by the navigator system 180. In the same or similar manner described above, the flight plan 184 may be computed that permits the aircraft to follow or navigate relative to the target aircraft at the distance above or below the target aircraft. An initial segment of the flight plan 184 can include an intercept path that places the aircraft behind the target aircraft at the specified distance above or below the target aircraft. A second segment of the flight plan 184 can include a flight path that substantially matches the flight plan of the target aircraft (e.g., with minor modifications based on altitude). The navigator system 180 can then control the AP/ST system 140 to execute the flight plan 184 and navigate the aircraft 105 to the specified height above or below the target aircraft. The ADS-B system 170 can continuously track the location and movements of the target aircraft (e.g., changes in altitude), and the navigator system 180 can adjust the flight plan 184 and/or AP/AT controller 185 to continuously operate the aircraft 105 at the specified distance above or below the target aircraft.

In another example, a follow side-by-side option 213 can be activated by an operator the aircraft 105 to navigate the aircraft 105 next or adjacent to a target aircraft identified by the ADS-B system 170 (e.g., in the horizontal or lateral direction). In certain embodiments, when activating the side-by-side option 213, an operator may select a target aircraft, and a distance between the two aircraft may be specified by the operator and/or automatically selected by the navigator system 180. In some cases, the vertical distance between the two aircraft also may be specified in a similar manner. The navigator system 180 can then compute a flight plan 184 that enables the aircraft to navigate to a position next to the target aircraft at the specified distance. In some examples, an initial segment of the flight plan 184 may include intercept path that places the aircraft 105 side-by-side with the target aircraft (e.g., at the specified horizontal and vertical distances). A second segment of the flight plan 184 may include a flight path that substantially matches the flight path of the target aircraft (e.g., with minor modifications based on the vertical or lateral distances). The navigator system 180 can then control the AP/ST system 140 to execute the flight plan 184. The ADS-B system 170 can continuously track the location and movements of the target aircraft, and the navigator system 180 can adjust the flight plan 184 and/or AP/AT controller 185 to continuously operate the aircraft 105 adjacent to the target aircraft at the specified distance settings adjacent.

In a further example, a follow offset option 215 can be activated that enables the aircraft 105 to be flown at a 3D position or offset (e.g., specifying x, y, and z coordinates) relative to a target aircraft identify by the ADS-B system 170. The 3D position or offset can identify a horizontal and vertical distance from the target aircraft, as well as a distance behind or in front of the aircraft. When activating the follow offset option 215, the operator may select the target aircraft, and the offset may be specified by the operator and/or automatically selected by the navigator system 180. The navigator system 180 can then compute a flight plan 184 that enables the aircraft to navigate the aircraft 105 at the specified offset relative to the target aircraft. An initial segment of the flight plan 184 can include an intercept path that places the aircraft 105 at the specified offset, and adjusts or aligns the heading and/or direction of the aircraft 105 to match the target aircraft. A second segment of the flight plan 184 can include a flight path that substantially matches the flight plan of the target aircraft (e.g., with minor modifications based of the offset parameters). The navigator system 180 can then control the AP/ST system 140 to execute the flight plan 184. The ADS-B system 170 can continuously track the location and movements of the target aircraft, and the navigator system 180 can adjust the flight plan 184 and/or AP/AT controller 185 to continuously operate the aircraft 105 at the specified offset relative to the target aircraft.

In other examples, the automated following options 210 also may include a follow formation option 216 that enables the aircraft to fly in a designated formation with at least one target aircraft. For example, military aircraft routinely fly in formations with multiple aircraft, such as a V-formation (e.g., arranged in a V-shape having three, five, seven or more aircraft), a diamond formation (e.g., arranged in a diamond shape having four aircraft), a line abreast formation (e.g., arranged in a straight line formation), an echelon formation (e.g., arranged in a diagonal line formation), a finger four formation (e.g., arranged with a single aircraft leading in front followed by multiple aircraft in rear organized in a V-formation), a box formation (e.g., arranged in a square or rectangular pattern), and/or other formations. The follow formation option 216 can be utilized to automatically operate or navigate an aircraft 105 in connection with these and/or other aircraft formations.

In certain embodiments, the navigator system 180 can utilize the ADS-B system 170 information to identify the locations of multiple target aircraft to be included in a given formation. The position of the aircraft 105 within the formation may be selected by the operator and/or automatically selected by the navigator system 180. The navigator system 180 can compute a flight plan 184 that places the aircraft 105 at the specified position in the formation. An initial segment of the flight plan 184 may include an intercept path that places the aircraft near the target aircraft, and a second segment of the flight plan 184 may include a flight path that inserts the aircraft 105 into a position of the fight formation (e.g., at a 3D offset relative to one or more aircraft included in the formation). A third segment of the flight plan 184 can include a flight path that substantially matches the flight path of the other aircraft included in the formation (e.g., with minor lateral and/or vertical deviations based on the position of the aircraft in the formation). The ADS-B system 170 can continuously track the location and movements of other aircraft in the formation, and the navigator system 180 can adjust the flight plan 184 and/or AP/AT controller 185 to continuously operate the aircraft 105 at the specified formation position relative to the other aircraft.

One of ordinary skill in the art would understand that many other types of automated following options 210 can be implemented using the techniques described herein.

Returning to FIG. 1, in addition to presenting information related to automated following options 210, the operator interface 130 also can display information and options that enable an aircraft to execute RNP and LPV approaches as described above.

In certain embodiments, prior to initiating a RNP approach, a pilot or operator can specify the destination airport identifier (e.g., via the operator interface 130) and the operator interface 130 will display a listing of destination runways at the corresponding airport. Upon selection of a desired destination runway, the operator interface 130 can display a listing of different RNP approaches associated with the runway. If the destination airport is available on the output bus of the FMS 115, the RNP information and other related data can be automatically populated. After the system is programmed with the aforementioned information, the pilot or operator can utilize the operator interface 130 to switch the aircraft from FMS control mode 121 to IGS control mode 122. Thereafter, the IGS 150 can provide control signals or commands to the flight control computer and/or AP/AT system 140 to execute the desired RNP approach, and the flight plan information can be provided to, and displayed on the EFIS 131, FMS CDU, MCDU and/or other operator interface 130.

The operator interface 130 can employ similar functionality for implementing a LPV approach. For example, prior to initiating a LPV approach, a pilot or operator can specify the destination airport identifier (e.g., via the operator interface 130), and the operator interface 130 will display a listing of destination runways at the corresponding airport. After the system is programmed with the aforementioned information, the pilot or operator can utilize the operator interface 130 to switch the aircraft from FMS control mode 121 to IGS control mode 122. Thereafter, the IGS 150 will perform GPS accuracy checks for the LPV approach, and identify any fail down checks to the pilot or operator. The IGS 150 can utilize the existing precision approach capability of the flight guidance system to perform the LPV approach. The operator interface 130 can display or indicate level of service options, which indicate the most precise approach minima currently available for the selected LPV approach. Exemplary level of service options are summarized in Table 1 below.

TABLE 1

| Level of Service | Description |
|---|---|
| LPV | Localizer Performance with Vertical Guidance |
| LP-B | Localizer Performance with Barometric Vertical Reference |
| LP | Localizer Performance with GPS Vertical Reference |
| LNAV/VNAV | Lateral Navigation with Vertical Navigation |
| LNAV/VNAV-B | Lateral Navigation with Vertical Navigation using Barometric Altitude |
| LNAV-B | Lateral Navigation with Barometric Vertical Reference |
| LNAV | Lateral Navigation with GPS Vertical Reference |

Thereafter, the IGS 150 can provide control signals or commands to the flight control computer and/or AP/AT system 140 to execute the desired LPV approach, and the flight plan information can be provided to, and displayed on the EFIS 131 and/or other operator interface 130.

In some scenarios, the precision approach capability of the flight guidance system can be utilized until the aircraft is in within a capture range of localizer and/or glideslope systems. At that point, the autopilot and/or autothrottle functions of the AP/AT system 140 can execute the remainder of the approach using information provided by the localizer and/or glideslope systems.

FIGS. 3A-3E illustrate exemplary screens or displays generated by an operator interface 130 that can be configured to implement the techniques described herein. As explained herein, the operator interface 130 can represent a display device associated with an EFIS 131, a standby unit 132, FMS CDU, MCDU, and/or a dedicated or separate display device. The operator interface 130 can be installed in a cockpit of an aircraft, and it can be configured to generate and display various graphical user interfaces (GUIs) which permit an operator to interact with the system 100.

In FIGS. 3A-3E, the exemplary operator interface 130 includes a hardware display device 300 that generates and displays GUIs, a menu button 303, and a control mode indicator 304. A top portion 301 of the GUI displays flight and instrument information for the aircraft (e.g., EFIS information), and a bottom portion 302 of the GUI displays information that can be updated based on various menu options.

Figure 3A:
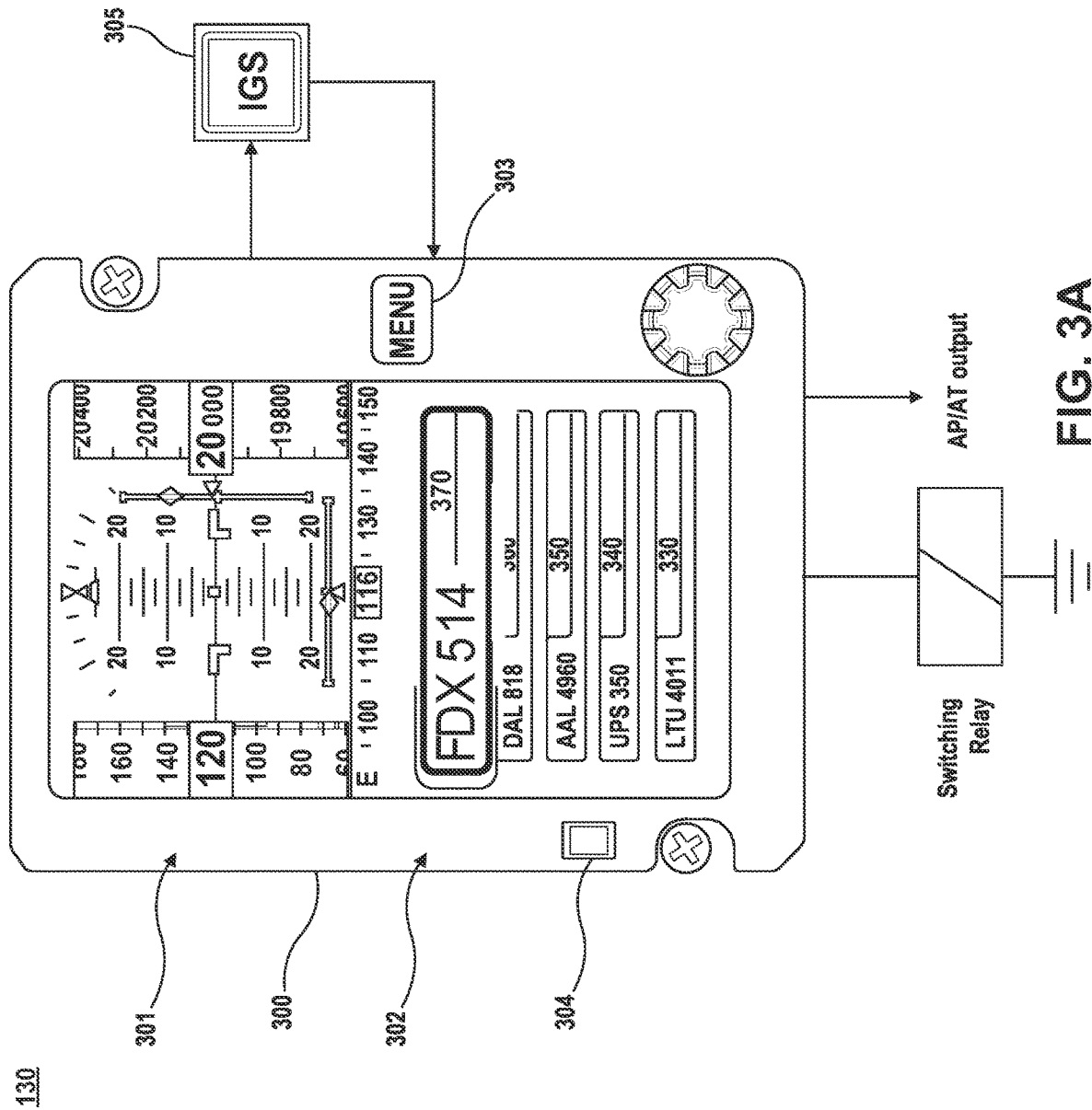
FIG. 3A is an illustration of an exemplary operator interface generated by a display device in accordance with certain embodiments.
Figure 3B:
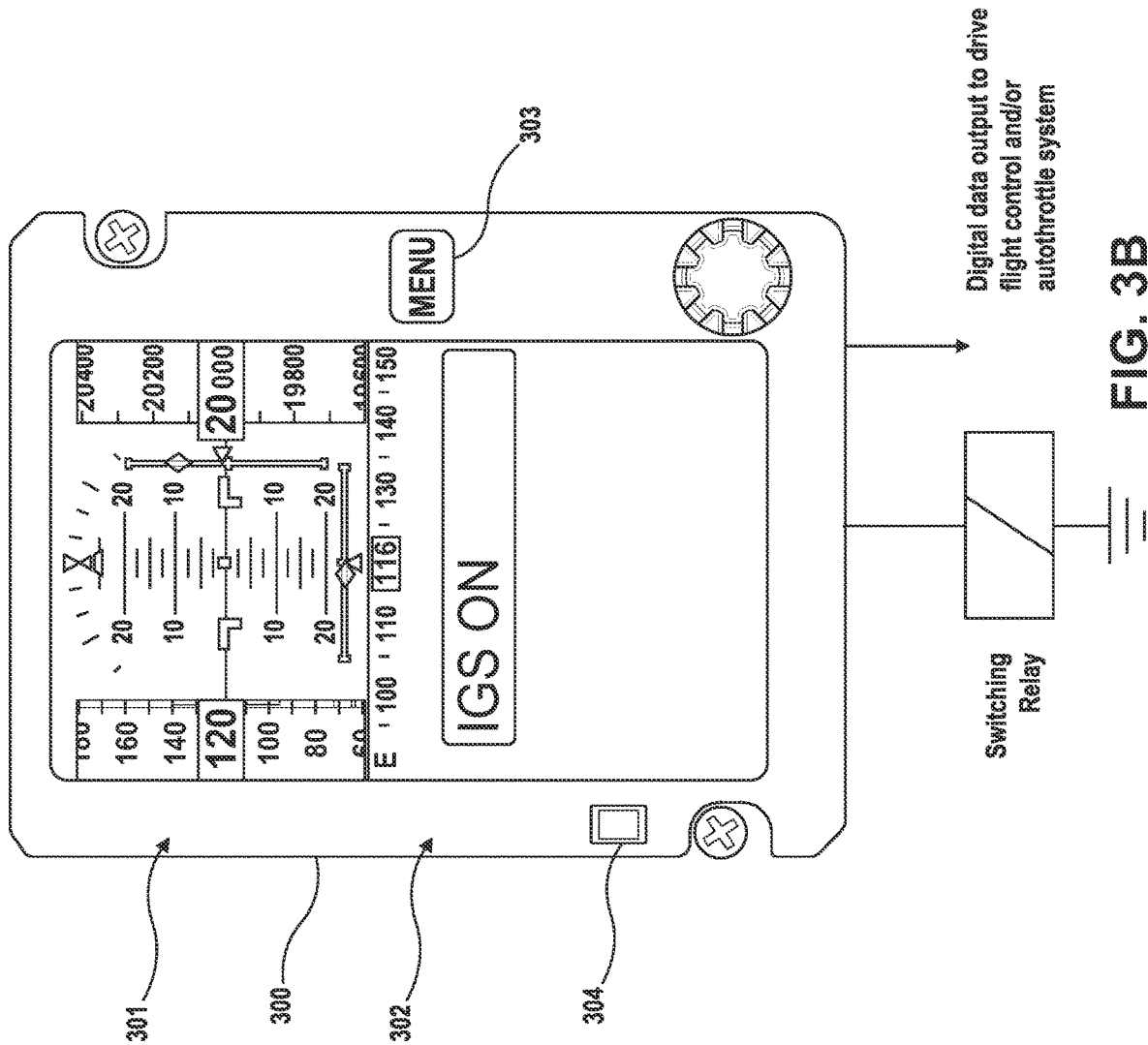
FIG. 3B is an illustration of an exemplary operator interface generated by a display device in accordance with certain embodiments.

FIGS. 3A and 3B illustrate two examples of how control the aircraft can be switched between a FMS control mode, which utilizes the FMS for navigation control, and an IGS control mode, which utilizes the IGS for navigation control.

In FIG. 3A, a switch 305 external to the operator interface 130 can be used to toggle between the FMS control mode 121 and the IGS control mode 122. The switch 305 may represent a hardware and/or software-based control option, and can generally be included anywhere in the cockpit. The switch 305 can be coupled to the operator interface 130 and/or switching unit 120 and can provide signals indicate which control mode is currently selected by the operator.

In FIG. 3B, the GUI generated by the operator interface 130 or display device 300 can present a selectable control option that permits switching between the FMS control mode 121 and the IGS control mode 122. In some scenarios, the GUI may be presented in response to an operator manipulating the menu button 303 and/or other controls of the operator interface 130.

In either configuration, the control mode indicator 304 can be used to determine or indicate a currently selected control mode. In some examples, the control mode indicator 304 can include a lighting component (e.g., a LED) that is activated or lit up when the IGS control mode 122 is active, and is deactivated or unlit when the FMS control mode 121 is active.

As shown in FIGS. 3A and 3B, the operator interface 130 can be connected to a switching relay that transitions navigation control between the FMS control mode 121 and the IGS control mode 122 based on an operator's selection. In certain embodiments, this switching relay may be included in the switching unit 120 described herein. The operator interface 130 also is configured to generate digital outputs for sending commands to control the AP/AT system 130 (e.g., such as in scenarios where the IGS control mode 122 is activated and one or more automated following options have been selected to navigate the aircraft).

Figure 3C:
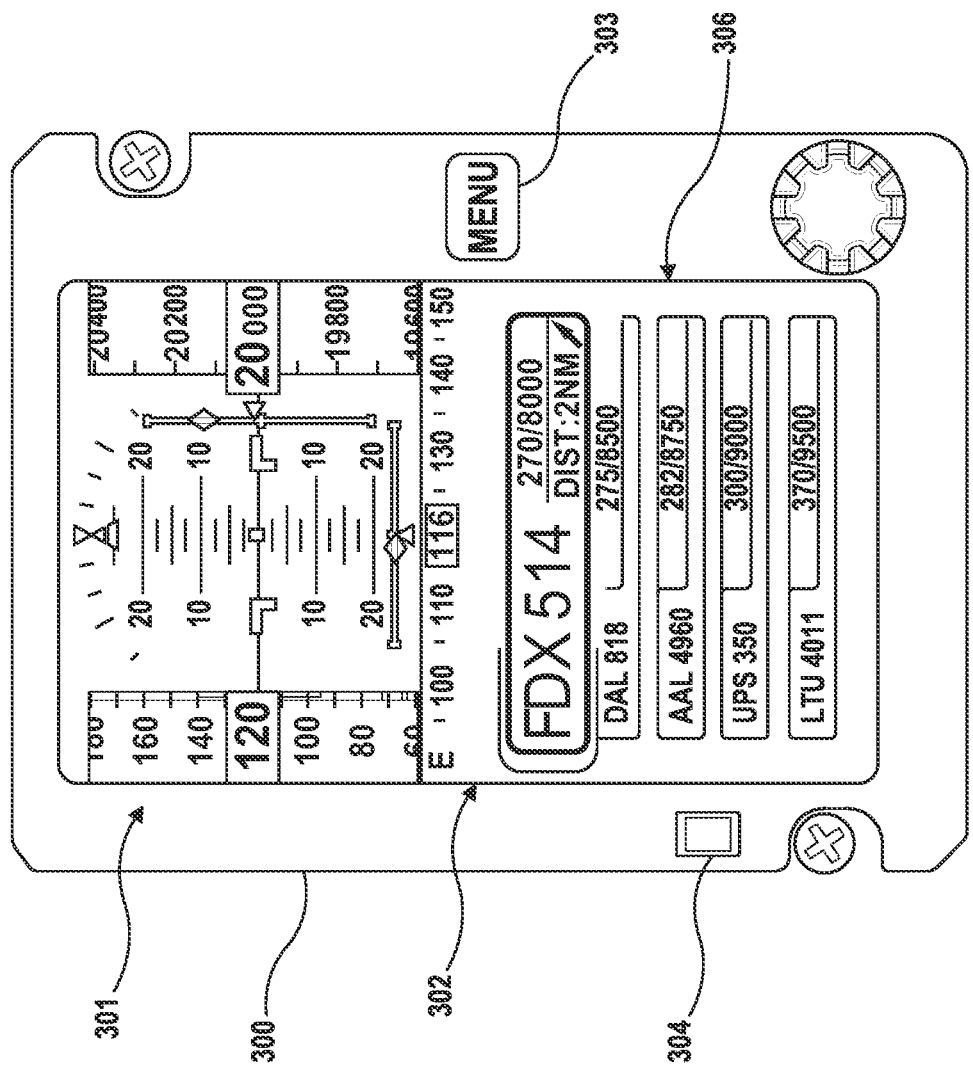
FIG. 3C is an illustration of an exemplary operator interface generated by a display device in accordance with certain embodiments.

FIG. 3C illustrates a scenario in which the IGS control mode 122 has been activated, thereby enabling the ADS-B system 170 to collect flight information 306 (e.g., TIS-B data) for nearby aircraft. The bottom portion 302 of the GUI displayed by the operator interface 130 has been updated to display the flight information 306 (also referred to as "aircraft traffic information" 306 in this disclosure) for each aircraft identified by the ADS-B system 170. Each aircraft is displayed as a selectable option in a listing, and an operator may select an option to view the flight information 306 collected by the ADS-B system 170 (e.g., the ADS-B input 171) for a corresponding aircraft. The flight information 306 for each aircraft can include, inter alia, the call sign or flight number associated with the aircraft, the GPS coordinates of the aircraft, aircraft type, flight status (e.g., on time or delayed), flight path, and the aircraft's departure and destination airports, the aircrafts' altitude, velocity and heading.

The operator can interact with the operator interface 130 and/or GUI displayed thereon to select desired aircraft and view the flight information for each of the aircraft. The operator also can interact with operator interface 130 and/or GUI displayed thereon to select various automated following options 210 that enable navigation of the aircraft to be automatically controlled relative to one or more of the aircraft identified by the ADS-B system 170. For example, in some embodiments, the operator may initially select a target aircraft from the listing presented on the operator interface 130, and then can select a desired automated following option 210 to control the operator's aircraft relative to the aircraft selected from the listing.

Figure 3D:
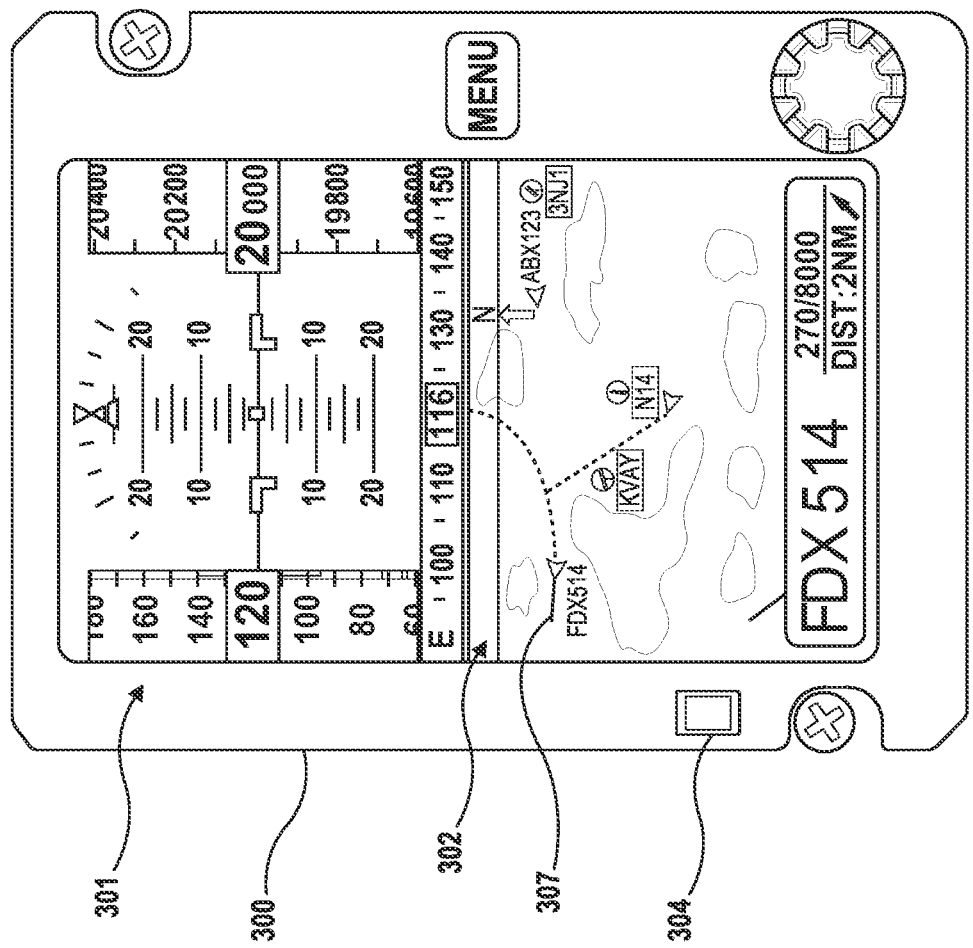
FIG. 3D is an illustration of an exemplary operator interface generated by a display device in accordance with certain embodiments.
Figure 3E:
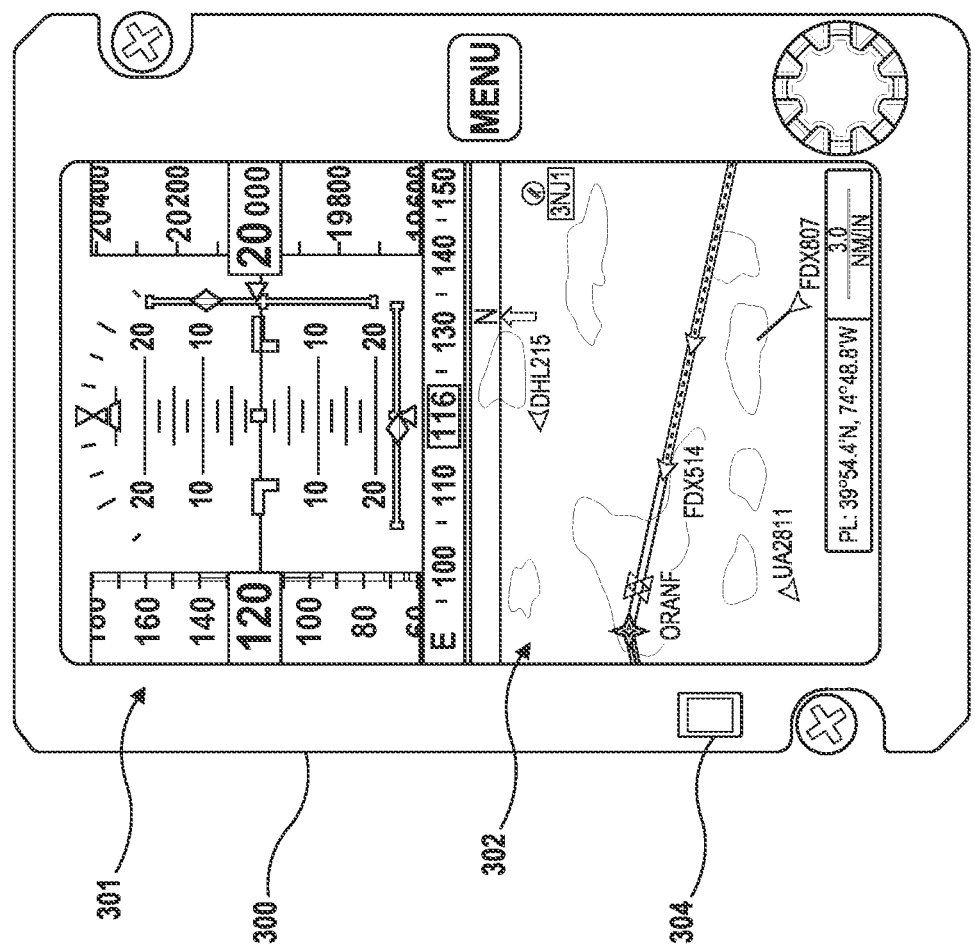
FIG. 3E is an illustration of an exemplary operator interface generated by a display device in accordance with certain embodiments.

FIGS. 3C-3E demonstrate an example in which a follow distance option 211 has been selected to control an operator's aircraft relative to a target aircraft (e.g., to trail or follow the target aircraft at a specified distance).

As shown in FIG. 3C, an operator has selected a target aircraft located at the top of the listing displayed on the operator interface 130. The flight information 306 for the target aircraft indicates that the target aircraft is travelling at a velocity of two-hundred and seventy miles per hour (mph) and an altitude of eight thousand feet. The GUI also indicates that the operator has activated a follow distance option 211 that causes the operator's aircraft to follow in the rear of a selected aircraft at a specified distance. In this example, the GUI or flight information 306 for the selected aircraft is updated to display a following distance of two nautical miles.

FIG. 3D illustrates the IGS system 150 or navigator system 180 computing an initial segment of a flight plan 184 for the selected automated following option 210. For example, in response to activating the follow distance option 211, the navigator system 180 computes an intercept path for navigating the aircraft 105 to a position that is two nautical miles behind the target aircraft 307. As shown, the operator interface 130 can display a map that displays the intercept path to the selected target aircraft 307. When the flight plan is executed, the navigator system 180 controls the AP/AT system 140 to place the operator's aircraft behind the selected aircraft at an altitude of eight thousand feet and a velocity of two-hundred and seventy miles per hour (mph).

FIG. 3E further demonstrates a second segment of the flight plan 184 being executed by the navigator system 180. The map shows the aircraft 105 is following the target aircraft on a matching flight plan or flight path. For example, after the operator's aircraft was navigated along the intercept path, the navigator system 180 controls the AP/AT system 140 to follow or trail the target aircraft at a distance of two nautical miles along the same flight path as the target aircraft. The ADS-B system 170 can continuously monitor the flight information 306 (e.g., the velocity, altitude, heading, etc.) for the target aircraft, and the navigator system 180 can adjust the flight plan or flight path of the aircraft 105 in response to detecting any changes in the flight information for the target aircraft 307, thereby enabling the operator's aircraft to continuously follow the target aircraft 307.

Figure 4:
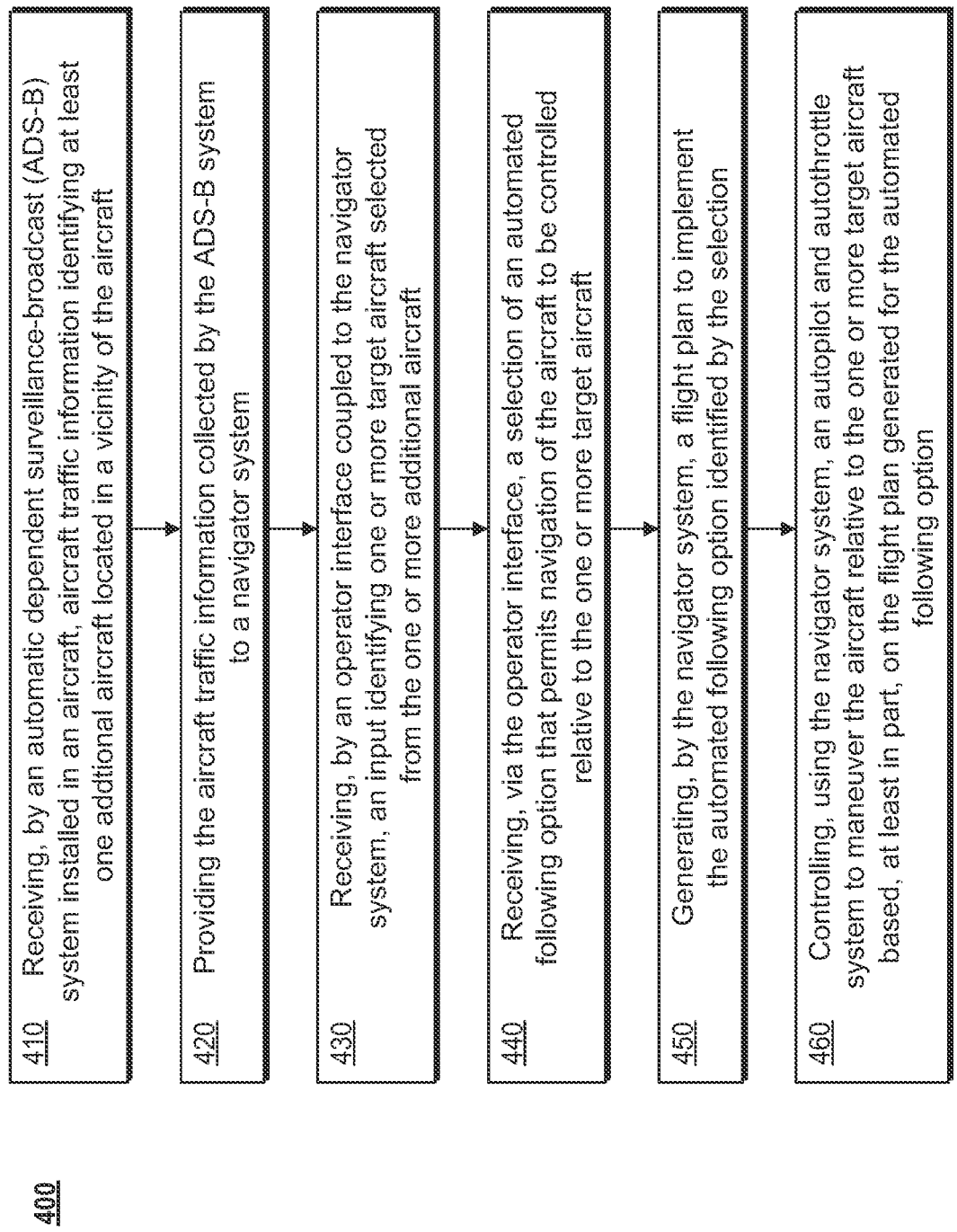
FIG. 4 is an exemplary method in accordance with certain embodiments.

FIG. 4 illustrates a flow chart for an exemplary method 400 according to certain embodiments. Method 400 is merely exemplary and is not limited to the embodiments presented herein. Method 400 can be employed in many different embodiments or examples not specifically depicted or described herein. In some embodiments, the steps of method 400 can be performed in the order presented. In other embodiments, the steps of method 400 can be performed in any suitable order. In still other embodiments, one or more of the steps of method 400 can be combined or skipped. In many embodiments, system 100, IGS system 150, and/or navigator system 180 can be configured to perform method 400 and/or one or more of the steps of method 400. In these or other embodiments, one or more of the steps of method 400 can be implemented as one or more computer instructions configured to run at one or more processing devices and configured to be stored at one or more non-transitory computer storage devices. Such non-transitory memory storage devices can be part of a computer system such as system 100, IGS system 150, and/or navigator system 180. The processing device(s) can be similar or identical to the processing devices described within this disclosure.

In step 410, aircraft traffic information 306 identifying at least one target aircraft 307 located in a vicinity of an aircraft 105 is received the automatic dependent surveillance-broadcast (ADS-B) system installed in an aircraft 105. For example, the ADS-B input 171 can be utilized to collect information on various aircraft in an operating range (e.g., 100-150 nautical miles) of the aircraft 105.

In step 420, the aircraft traffic information 306 collected by the ADS-B system is provided by to a navigator system 180 installed in the aircraft 105.

In step 430, an input is received by an operator interface identifying one or more target aircraft 307 selected from the one or more additional aircraft. For example, the aircraft traffic information 306 for the at least one additional aircraft may be displayed on an operator interface 130 coupled to the navigator system 180. In some scenarios, the operator interface 130 may include an EFIS display 131, a standby unit display 132, a FMS CDU, a MCDU display, and/or other display included in a cockpit of the aircraft 105, and the operator interface 130 can be directly or indirectly coupled to the operator interface 130. The operator can interact with the operator interface 130 to select one or more target aircraft 307.

In step 440, a selection of an automated following option 210 is received via the operator interface 130 that permits navigation of the aircraft 105 to be controlled relative to the one or more target aircraft. Exemplary automated following options 210 can include a follow distance option 211, a follow height option 212, a follow side-by-side option 213, a follow time option 214, a follow offset option 215, and/or a follow formation option 216.

In step 450, a flight plan 184 is generated by the navigator system 180 to implement the automated following option 210 identified by the selection. In some embodiments, a first segment of the flight plan 184 may include an intercept path for placing the aircraft 105 at location or position near the at least one aircraft, and a second segment of the flight plan 184 can include a flight path that substantially matches the flight plan of the at least one additional aircraft while accounting for adjustments of the selected automated following option 210 (e.g., adjustments for trailing the at least one additional aircraft or flying side-by-side with the at least one additional aircraft).

In step 460, an autopilot and autothrottle system 140 is controlled by the navigator system 180 to maneuver the aircraft 105 relative to the one or more target aircraft based, at least in part, on the flight plan 184 generated for the automated following option 210. For example, the autopilot and autothrottle system 140 can initially navigate the aircraft along the intercept path, and then along the flight path that substantially matches the flight path of the at least one additional aircraft. The flight path of the at least one additional aircraft can be monitored continuously by the ADS-B system 170 and the flight plan 184 for the aircraft 105 can updated to account for any detected changes.

As evidenced by the disclosure herein, the inventive techniques set forth in this disclosure are rooted in aviation technologies that overcome existing problems in known aviation systems, including problems associated with enhancing the functionalities of legacy FMSs and implementing automated aircraft navigation controls. The techniques described in this disclosure provide a technical solution (e.g., one that utilizes improved vehicle navigation system configurations and enhanced processing of ADS-B information) for overcoming the limitations associated with known techniques. This technology-based solution marks an improvement over existing capabilities and functionalities by improving the accuracy and precision of the navigation systems and improved automated control systems.

The techniques and solutions described in this disclosure can applied to navigation systems for any type of aircraft (e.g., commercial airplanes, military airplanes, helicopters, air ships, etc.). Appropriate adaptations or modifications can be incorporated to tailor these techniques and solutions to particular types of aircraft.

Each of the components illustrated in FIG. 1 (including the flight management computers (FMCs) 110, switching units 120, operator interfaces 130, AP/AT system 140, IGSs 150, air data computers (ADCs) 151, AHRSs 152, positioning systems 160, ADS-B systems 170, and navigator systems 180 can include one or more processing devices for executing their respective functions described herein. Each of these components also can include one or more computer storage devices that store to facilitate these and other functions, and the instructions can be executed by the one or more processing devices.

The one or more processing devices may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions.

The one or more computer storage devices may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc.

In certain embodiments, a method is provided for controlling navigation of an aircraft. The method comprises: a) receiving, by an automatic dependent surveillance-broadcast (ADS-B) system installed in an aircraft, aircraft traffic information identifying at least one additional aircraft located in a vicinity of the aircraft; b) providing the aircraft traffic information collected by the ADS-B system to a navigator system; c) displaying, by an operator interface coupled to the navigator system, the aircraft traffic information for the at least one additional aircraft; d) receiving, by an operator interface coupled to the navigator system, an input identifying one or more target aircraft selected from the one or more additional aircraft; e) receiving, via the operator interface, a selection of an automated following option that permits navigation of the aircraft to be controlled relative to the one or more target aircraft; f) generating, by the navigator system, a flight plan to implement the automated following option identified by the selection; and g) controlling, using the navigator system, an autopilot and autothrottle system to maneuver the aircraft relative to the one or more target aircraft based, at least in part, on the flight plan generated for the automated following option.

In certain embodiments, an aircraft system is provided. The aircraft system includes: a) an automatic dependent surveillance-broadcast (ADS-B) system installed in an aircraft and configured to collect aircraft traffic information identifying at least one additional aircraft located in a vicinity of the aircraft; b) an operator interface configured to display the aircraft traffic information for the at least one additional aircraft; c) an autopilot and autothrottle (AP/AT) system; and d) a navigator system coupled to the ADS-B system, the operator interface, and the AP/AT system, wherein the navigator system is configured to control navigation of the aircraft. The aircraft traffic information collected by the ADS-B system is provided to the navigator system, and the operator interface is configured to receive a selection of an automated following option that permits navigation of the aircraft to be controlled relative to one or more target aircraft. The navigator system is configured to generate a flight plan to implement the automated following option identified by the selection. The navigator system is configured to control the APT/AT system to maneuver the aircraft relative to the one or more target aircraft based, at least in part, on the flight plan generated for the automated following option.

In certain embodiments, another aircraft system is provided. The aircraft system includes: a) a flight management system (FMS) configured to control navigation of an aircraft in a first control mode; b) a navigator system configured to control navigation of an aircraft in a second control mode; c) an automatic dependent surveillance-broadcast (ADS-B) coupled to the navigator system; d) an operator interface coupled to the navigator system; e) an autopilot and autothrottle (AP/AT) system coupled to the navigator system; and f) a switching unit coupled to the FMS and the navigator system. The switching unit is configured to transition the aircraft between a first control mode which utilizes the FMS to control navigation of the aircraft, and a second control mode which utilizes the navigator system to control navigation of the aircraft. In the second control mode, the aircraft is configured with required navigation performance (RNP) and localizer performance with vertical guidance (LPV) capabilities. In the first control mode, the aircraft is not configured with the RNP and the LPV capabilities.

In certain embodiments, another method is provided. The method comprises: a) providing a flight management system (FMS) configured to control navigation of an aircraft in a first control mode; b) providing a navigator system configured to control navigation of an aircraft in a second control mode; and c) providing a switching unit coupled to the FMS and the navigator system. The navigator system is coupled to an automatic dependent surveillance-broadcast (ADS-B), an operator interface, and an autopilot and autothrottle (AP/AT) system coupled to the navigator system. The switching unit is configured to transition the aircraft between a first control mode which utilizes the FMS to control navigation of the aircraft, and a second control mode which utilizes the navigator system to control navigation of the aircraft. In the second control mode, the aircraft is configured with required navigation performance (RNP) and localizer performance with vertical guidance (LPV) capabilities. In the first control mode, the aircraft is not configured with the RNP and the LPV capabilities.

Embodiments may include a computer program product accessible from a computer-usable or computer-readable medium providing program code for use by or in connection with a computer or any instruction execution system. The computer program product may store instructions for implementing the functionality of the navigation system and/or other component described herein. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or storage devices through intervening private or public networks. Satellite transceivers, wireless transceivers, modems, and Ethernet cards are just a few of the currently available types of network adapters.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:
1. An aircraft system comprising:
   a flight management system (FMS) installed in an aircraft and configured to control navigation of the aircraft in a first control mode;
   a navigator system installed in the aircraft and configured to control navigation of the aircraft in a second control mode;
   an automatic dependent surveillance-broadcast (ADS-B) system installed in the aircraft and coupled to the navigator system;
   an operator interface coupled to the navigator system;

an autopilot and autothrottle (AP/AT) system coupled to the navigator system; and a switching unit installed in the aircraft and coupled to the FMS and the navigator system;

wherein:
the FMS and the navigator system are separate navigation control systems, each capable of separately controlling navigation of the aircraft;

when the navigator system controls the aircraft's navigation, the aircraft has increased precision guidance capabilities compared to when the aircraft's navigation is controlled by the FMS;

the switching unit determines whether the aircraft's navigation is currently controlled by the FMS or the navigator system;

the switching unit is configured to transition the aircraft between the first control mode which utilizes the FMS to control navigation of the aircraft, and the second control mode which utilizes the navigator system to control navigation of the aircraft;

in response to the switching unit transitioning to the second control mode, the navigator system assumes control of the aircraft's navigation and enables required navigation performance (RNP) and localizer performance with vertical guidance (LPV) capabilities; and in response to the switching unit transitioning to the first control mode, the FMS assumes control of the aircraft's navigation without the RNP and the LPV capabilities.

2. The aircraft system of claim 1, wherein:
the navigator system and the ADS-B system are included in an integrated guidance system (IGS);
the IGS further includes at least one air data computer (ADC) that is coupled to the navigator system; and
the IGS further includes at least one positioning system that is coupled to the navigator system.

3. The aircraft system of claim 2, wherein the IGS is installed after the FMS is installed in the aircraft, and the IGS upgrades the aircraft with the RNP and the LPV capabilities.

4. The aircraft system of claim 1, wherein:
in the second control mode, the navigator system utilizes flight information obtained from the ADS-B system to implement one or more automated following options.

5. The aircraft system of claim 4, wherein the one or more automated following options include:
a follow distance option that causes the aircraft to follow behind one or more target aircraft at a specified distance;
a follow height option that causes the aircraft to fly at a specified distance above or below one or more target aircraft;
a follow side-by-side option that causes the aircraft to fly side-by-side with one or more target aircraft;
a follow time option that causes the aircraft to follow behind one or more target aircraft at a specified time interval;
a follow offset option that causes the aircraft to fly at a three-dimensional offset relative to one or more target aircraft; or
a follow formation option that enables the aircraft to fly in a designated formation with one or more target aircraft.

6. The aircraft system of claim 1, wherein:
the operator interface is configured to display aircraft traffic information from the ADS-B system;

the aircraft traffic information identifies at least one additional aircraft located in a vicinity of the aircraft;

the operator interface is configured to receive a selection of a target aircraft selected from the at least one additional aircraft; and the operator interface is configured to receive a second selection of an automated following option that enables automated control of the aircraft relative to the target aircraft.

7. The aircraft system of claim 6, wherein:
the navigator system is configured to generate a flight plan to implement the automated following option identified by the selection; and
the navigator system is configured to control the AP/AT system to maneuver the aircraft relative to the target aircraft based, at least in part, on the flight plan generated for the automated following option.

8. The aircraft system of claim 7, wherein:
while operating the aircraft according to the automated following option, the ADS-B system continuously monitors flight information for the target aircraft and the navigator system adjusts control of the AP/AT system based on changes in the flight information for the target aircraft.

9. A method comprising:
providing a flight management system (FMS) installed in an aircraft, the FMS being configured to control navigation of the aircraft in a first control mode;

providing a navigator system installed in the aircraft and configured to control navigation of the aircraft in a second control mode, wherein the navigator system is coupled to an automatic dependent surveillance-broadcast (ADS-B) system installed in the aircraft, an operator interface, and an autopilot and autothrottle (AP/AT) system; and providing a switching unit installed in the aircraft, the switching unit being coupled to the FMS and the navigator system;

wherein:
the FMS and the navigator system are separate navigation control systems, each capable of separately controlling navigation of the aircraft;

when the navigator system controls the aircraft's navigation, the aircraft has increased precision guidance capabilities compared to when the aircraft's navigation is controlled by the FMS;

the switching unit determines whether the aircraft's navigation is currently controlled by the FMS or the navigator system;

the switching unit is configured to transition the aircraft between the first control mode which utilizes the FMS to control navigation of the aircraft, and the second control mode which utilizes the navigator system to control navigation of the aircraft;

in response to the switching unit transitioning to the second control mode, the navigator system assumes control of the aircraft's navigation and enables required navigation performance (RNP) and localizer performance with vertical guidance (LPV) capabilities; and in response to the switching unit transitioning to the first control mode, the FMS assumes control of the aircraft's navigation without the RNP and the LPV capabilities.

10. The method of claim 9, wherein:
the navigator system and the ADS-B system are included in an integrated guidance system (IGS);

the IGS further includes at least one air data computer (ADC) that is coupled to the navigator system; and the IGS further includes at least one positioning system that is coupled to the navigator system.

11. The method of claim 10, further comprising:

installing the IGS in the aircraft after the FMS is installed in the aircraft, wherein the IGS upgrades the aircraft with the RNP and the LPV capabilities.

12. The method of claim 9, wherein:

in the second control mode, the navigator system utilizes flight information obtained from the ADS-B system to implement one or more automated following options.

13. The method of claim 12, wherein the one or more automated following options include:

a follow distance option that causes the aircraft to follow behind one or more target aircraft at a specified distance;

a follow height option that causes the aircraft to fly at a specified distance above or below one or more target aircraft;

a follow side-by-side option that causes the aircraft to fly side-by-side with one or more target aircraft;

a follow time option that causes the aircraft to follow behind one or more target aircraft at a specified time interval;

a follow offset option that causes the aircraft to fly at a three-dimensional offset relative to one or more target aircraft; or a follow formation option that enables the aircraft to fly in a designated formation with one or more target aircraft.

14. The method of claim 13, wherein:

the operator interface is configured to display aircraft traffic information from the ADS-B system;

the aircraft traffic information identifies at least one additional aircraft located in a vicinity of the aircraft;

the operator interface is configured to receive a selection of a target aircraft selected from the at least one additional aircraft; and the operator interface is configured to receive a selection of an automated following option that enables automated control of the aircraft relative to the target aircraft.

15. The method of claim 14, wherein:

the navigator system is configured to generate a flight plan to implement the automated following option identified by the selection; and the navigator system is configured to control the AP/AT system to maneuver the aircraft relative to the target aircraft based, at least in part, on the flight plan generated for the automated following option.

16. The method of claim 15, wherein:

while operating the aircraft according to the automated following option, the ADS-B system continuously monitors the flight information for the target aircraft and the navigator system adjusts control of the AP/AT system based on changes in the flight information for the target aircraft.

* * * * *